(12) United States Patent
De Labareyre et al.

(10) Patent No.: US 6,484,772 B1
(45) Date of Patent: Nov. 26, 2002

(54) TREAD PATTERN AND METHOD OF MANUFACTURE

(75) Inventors: Bertrand Garnier De Labareyre, Chamalieres (FR); Jose Merino Lopez, Riom (FR)

(73) Assignee: Compagnie Générale des Establissements Michelin-Michelin & Cie, Clemont-Ferrand Cedex (FR)

( * ) Notice: Subject to any disclaimer, the term of this patent is extended or adjusted under 35 U.S.C. 154(b) by 0 days.

(21) Appl. No.: 09/364,646

(22) Filed: Jul. 30, 1999

Related U.S. Application Data

(63) Continuation of application No. PCT/EP98/00625, filed on Feb. 5, 1998.

(30) Foreign Application Priority Data

Feb. 12, 1997 (FR) .............................. 97 01846

(51) Int. Cl.$^7$ .................. B29D 30/00; B29D 30/52; B60C 11/12; B60C 11/13
(52) U.S. Cl. .................. 152/209.17; 152/209.18; 152/209.22; 152/211; 152/212; 152/DIG. 3; 156/110.1; 156/123; 156/127; 156/128.1; 156/129
(58) Field of Search .................. 152/211, 212, 152/209.17, 209.18, 209.21, 209.22, DIG. 3; 156/110.1, 123, 127, 128.1, 128.6, 129; 264/326; 425/28.1, 46

(56) References Cited

U.S. PATENT DOCUMENTS

| | | | | |
|---|---|---|---|---|
| 1,301,343 A | * | 4/1919 | Waterman | |
| 2,201,668 A | * | 5/1940 | Kraft | |
| 2,345,518 A | * | 3/1944 | Wendel | |
| 2,476,786 A | * | 7/1949 | Wallis | .............. 152/212 |
| 2,661,041 A | | 12/1953 | Walsh | |
| 5,022,448 A | | 6/1991 | Ochiai | |
| 6,050,313 A | * | 4/2000 | Tsuda | .............. 152/209.22 |
| 6,116,310 A | * | 9/2000 | Shinohara | .............. 152/DIG. 3 |
| 6,143,223 A | * | 11/2000 | Lopez | .............. 425/46 |

FOREIGN PATENT DOCUMENTS

| | | | | |
|---|---|---|---|---|
| DE | 4403662 | | 8/1995 | |
| EP | 0367557 | | 5/1990 | |
| EP | 858875 | * | 8/1998 | .............. 152/209.22 |
| GB | 515129 | * | 11/1939 | .............. 152/DIG. 3 |
| GB | 2061837 | | 5/1981 | |
| JP | 63-137003 | * | 6/1988 | |
| JP | 2-310108 | * | 12/1990 | .............. 152/DIG. 3 |
| JP | 3-14704 | * | 1/1991 | .............. 152/209.22 |
| JP | 4-353432 | * | 12/1992 | .............. 152/DIG. 3 |
| JP | 9-2020 | * | 1/1997 | .............. 152/209.21 |

OTHER PUBLICATIONS

Translation of Japan 3–14704.*

* cited by examiner

*Primary Examiner*—Steven D. Maki
(74) *Attorney, Agent, or Firm*—Baker Botts L.L.P.

(57) ABSTRACT

A tread for a tire, the tread being provided with a plurality of cutouts, defined by walls perpendicular to or oblique to the rolling surface of the tread, in which the two main walls of at least one cutout located in the part of the tread affected by the loading on the ground of the tire during travel are connected by at least one rubber connecting element and in that the total connection surface $S_E$ of the connecting element(s) is at most 80% of the surface defined by the geometric contour L of minimum length and surrounding said total connection surface $S_E$. A method for producing a cutout provided with at least one connecting element.

45 Claims, 5 Drawing Sheets

US 6,484,772 B1

TREAD PATTERN AND METHOD OF MANUFACTURE

This is a continuation of PCT/EP 98/00625 filed Feb. 5, 1998.

BACKGROUND OF THE INVENTION

The invention relates to treads for the manufacture of new tires or for the recapping of tires, and in particular to the patterns for said treads which comprise a large number of cutouts in the form of grooves and/or incisions. It also relates to a production method making it possible to produce such treads.

In order to adapt the performance of tires to the increasingly improved performance of new vehicles, it is becoming necessary, inter alia, to increase the level of the adhesion performance of the tires on a wet road, without for all that adversely affecting the other types of performance thereof. "Adhesion" is understood to mean both the adhesion properties of the tire in the direction transverse to the displacement of the vehicle (cornering ability) and those of the tire in the direction longitudinal to the displacement of the vehicle (possibility of transmitting a braking or driving force to the ground).

In order to increase the adhesion potential of a tread of a tire traveling on a road covered with water, it is known to provide this tread with a pattern formed of a plurality of cutouts formed at greater or lesser depths in said tread, said cutouts opening on to the surface of said tread in contact with the road (this surface is called the rolling surface).

"Cutout" quite obviously means formed in the tread, be it by removing material once the tread has been vulcanized or be it by molding in a mold for molding said strip and comprising molding elements which project on the molding surface of said mold, each molding element having a geometry identical to the geometry of the desired cutout. As a general rule, a cutout made in a tread is defined by at least two walls of rubber which face one another, said walls being separated by an average distance representing the width of the cutout, the intersection of said walls with the rolling surface forming rubber ridges. Several types of cutout can be distinguished, for example:

grooves or furrows characterized by a width greater than about 10% of the thickness of the tread;

incisions of relatively low width compared with the thickness of the tread; under certain conditions of stress, these incisions may close, at least partially, in contact with the road;

the walls facing one another come into contact with one another at least over a more or less large part of the surfaces of said walls (the ridges formed by an incision on the rolling surface are in contact, which causes the incision to close).

Some cutouts may open into at least one other cutout. The trace of a cutout on the rolling surface of a tread follows an average geometric profile determined as the geometric profile located at an average distance from the ridges formed by the walls of said cutout on the rolling surface. The center axis of the trace of a cutout on the rolling surface corresponds to the straight line of the least-error squares of the distances of the points of the average profile from the trace of said cutout. Furthermore, it is usual to define the groove ratio of a pattern as the following ratio: area of the cutouts on the rolling surface divided by the total area of contact between the tire and the road.

By effecting a plurality of cutouts which open on to the rolling surface, a plurality of rubber ridges is created to break up the layer of water which may be present on the road, so as to keep the tire in contact with the ground and to create cavities forming channels intended to collect and remove the water present in the zone of contact of the tire with the road since they are arranged so as to open outside the zone of contact.

An example of such a pattern is found in U.S. Pat. No. 1,452,099, which describes a tread provided with a plurality of regularly spaced incisions of transverse orientation.

However, the increase in the number of cutouts rapidly results in a substantial decrease in the rigidity of the tread, which has an adverse effect on the performance of the tire, and even on the adhesion. "Rigidity of the tread" is understood to mean the rigidity of the tread under the combined actions of compressive stresses and shearing stresses in the region affected by the contact with the road. Conjointly, the presence of numerous cutouts forming channels for evacuating water results in a level of traveling noise on a dry road which is nowadays considered as a nuisance which it is desired to reduce to as great an extent as possible, very particularly on vehicles of recent design. This traveling noise is amplified by the cyclical movements of closing and opening of the cutouts which are associated with the friction of the walls of said cutouts when they are closed.

In French Patent 1 028 978, a solution to this problem is proposed which consists in providing the tread with a plurality of circumferential incisions of low depth over the rolling surface of the new tread so as to increase the flexibility of said tread solely in the vicinity of the rolling surface.

However, since the tire, once mounted on a vehicle, is intended to provide good performance during the entire life of said tire (that is to say, until its tread has worn down to a level corresponding at least to the legally permitted level), it is necessary to provide a tread having a pattern which ensures the lasting quality of the adhesion performance on wet ground.

SUMMARY OF THE INVENTION

The object of the present invention is to develop a tread for a tire which manages to combine a very good level of adhesion to a wet road and to a dry road with a low emission of noise while traveling when new and during at least a major part of the life of said tread. Complementary, one of the objects of the invention is to control the evolution of the performance with the wear of the tread.

According to the invention, a tread is proposed, of thickness E in a rubber mix, intended to be placed radially on the outside of a tire, said tread being provided with a rolling surface which is intended to come into contact with the road during the travel of the tire. The tread is provided with a large number of cutouts such that a plurality of cutouts is affected by the zone of contact of the tire with the road. Each cutout is defined by the space enclosed mainly between two opposing walls, said walls being perpendicular to or oblique to the rolling surface, and each cutout has a depth at most equal to the thickness E of the tread, the depth of said cutout being measured as the distance in a radial direction between the points of the contour of said cutout which are farthest from the rolling surface of the new tire and said rolling surface. Furthermore, two main walls of at least one cutout located in the part of the tread affected by the loading on the ground of the tire during travel are connected by at least one rubber connecting element.

The reference $S_E$ is given to the total connection surface on each of the walls of said cutout equal either to the total intersection surface of the connecting element in the case of a single element or to the total of the intersection surfaces of all the connecting elements in the case of several elements, and the total surface of each of the main walls of said cutout is referenced $S_T$.

The tread according to the invention is characterized in that:

the two main walls of at least one cutout located in the part of the tread affected by the loading on the ground of the tire during travel are connected by at least one rubber connecting element, the connecting element(s) having with each of the walls a connection surface $S_E$ corresponding to the total of the intersection surfaces of each connecting element, said surface $S^E$ on each of the walls being at least 10% of the surface $S_T$ of said wall, all the points of the outer contour of the surface of intersection of at least one connecting element with one of the walls are located at a distance from the rolling surface which is strictly less than the depth of the cutout, and in that, on each of the main walls, the connection surface $S_E$ is at most 80% of the surface $S_G$, the surface $S_G$ being equal to the surface, measured on said wall of the cutout, defined by the geometric contour L of minimum length traced on said wall and enveloping the connection surface $S_E$.

For a wall, the geometric contour L of minimum length enveloping the total connection surface $S_E$ on this wall corresponds to the contour which can be traced on said wall so as to envelop all the total connection surface formed by the intersection surfaces of all the connecting elements with said wall. As a cutout is defined as being the continuous space defined by at least two main walls facing one another, the presence of at least one connecting element between said walls, according to the invention, does not interrupt the continuity of this space, whatever the level of wear of the tread comprising such a cutout.

Advantageously, the effect on the adhesion and noise performance is the more significant the larger the number of cutouts forming the pattern of a tread for a tire are provided with at least one rubber connecting element so as to obtain both an outstanding adhesion performance without for all that adversely affecting the level of performance in terms of traveling noise.

Advantageously, and in order to obtain an optimum connection effect between the walls of the cutouts and a sufficient length of rubber ridges, each surface $S_G$ defined by the geometric contour L of minimum length and enveloping the total connection surface $S_E$ on one main wall of a cutout is at least 15% of the surface of the corresponding wall $S_T$. Preferably, the total connection surface $S_E$ over at least one main wall of at least one cutout is at most 80% of the surface of the corresponding wall $S_T$, so as to preserve a volume of cutout imparting to the tread sufficient adhesion characteristics.

The tread according to the invention has several advantages:

for cutouts oriented substantially transversely to the longitudinal direction of the tread, the impacts of the rubber ridges on the road are reduced, which results in substantial reduction of the noise emitted during traveling, and this despite a relatively large number of ridges;

on emerging from the area of contact, the presence of connecting elements between the walls of the incisions oriented transversely and possibly between the opposing faces of the relief elements limits the oscillating movements of the rubber elements of the tire emerging from said area which cause noise-generating vibrations, thus reducing the noise resulting from these vibrations;

the reduction of the noise component also results from the reduction of the friction of the walls of the incisions on one another when passing into contact, the connecting elements preventing both the moving-together of the walls and the movement of one relative to the other;

a very marked improvement in adhesion, whilst maintaining a large surface of rubber to be worn in the case of a plurality of incisions of low width, said incisions being provided with at least one connecting element.

Overall, the sources of noise which are associated with such a pattern are far less strong owing to the reduction of movement of the walls of the cutouts resulting from the presence of the connecting elements between said walls compared with a pattern which would comprise the same cutouts without any connecting element.

It goes without saying that a tread pattern according to the invention may combine both a plurality of cutouts provided with at least one connecting element with a plurality of cutouts without a connecting element, the proportion between said cutouts possibly being, for example, a function of the type of tire comprising said pattern.

The applicant has surprisingly obtained very good results when using tires provided with a tread of thickness E, provided with a plurality of cutouts oriented virtually in the same direction, each of said cutouts being defined by the space defined principally between two opposing walls, said walls being perpendicular to or oblique to the rolling surface, and said cutouts having a depth h.

"Depth h of a cutout" is understood to mean the maximum radial distance measured between the ridge of the cutout closest to the rolling surface of the tread when new and the point(s) of the walls of the cutout which is or are radially farthest from said rolling surface. This depth h represents the maximum radial distance between the radially farthest points of the walls of a cutout, and is at most equal to the thickness E of the tread.

Furthermore, the tread according to one variant of the invention is such that:

the two main walls of said cutouts are connected by at least one rubber connecting element;

the connecting rate $T_P = S_E/S_T$, $S_E$ for each cutout is at least 0.10 and at most 0.80, $S_E$ being equal to the total intersection surface of the connecting element(s) on each of the walls, $S_T$ representing the total surface of each main wall of said cutout;

the ratio p/h, between the average pitch p between each of said cutouts and their depth h, is at least 0.2 and at most 1.9.

In order to avoid the appearance of irregular wear of the tread and if a value of the connecting rate $T_P$ of the cutouts is fixed, it is then preferable to select the pitch p such that the ratio p/h, in the new state, satisfies the following equation:

$$\frac{p}{h} \geq \frac{1}{5}\left(\frac{1}{T_P}\right)^{0.75}$$

Complementary, and in order to achieve a good adhesion performance, it is judicious to select the pitch p such that the ratio p/h satisfies the following equation:

$$\frac{p}{h} \leq 2(1-T_P)^{0.5}$$

It is also possible to make allowance for the average width e of the cutouts (that is to say, the average distance between the main walls of said cutouts) arranged regularly according to a pitch p on a tread so as to obtain the connecting rate $T_p$ which makes it possible to achieve good results during traveling. It has has been found that good adhesion and wear results are obtained when the connecting rate $T_p$ is at least 0.10 and is at most equal to the following value:

$$\frac{1}{\left(1+\frac{1}{3}\epsilon\right)^{0.75}}$$

in which $\epsilon=(p-e)/h$.

Once the connecting rate $T_P$ is less than about 0.10, the object cannot be achieved because the connecting elements do not supply sufficient rigidity, and cannot sufficiently block the movements of the walls of the cutout to which they are connected; preferably the connecting rate $T_P$ is greater than 0.25.

On the other hand, when this rate exceeds the limit value proposed, the rigidity becomes too great and the length of active ridge is too small to maintain satisfactory adhesion performance. "Length of active ridge" of a tread of a tire is understood to mean the total of the lengths of all the rubber ridges in contact with the road in the imprint and for a given level of wear of the tread.

Furthermore, and in order to maintain a sufficiently constant performance with the wear of the tread, it is judicious to provide for the value of the connecting rate $T_P=S_P/S_T$, evaluated for different levels of wear of the tread to decrease substantially regularly with the wear of the tire, at least starting from a predetermined partial level of wear $S_P$ representing, on one of the walls of said cutout, the connection surface remaining after partial wear of the tread and $S_T$ representing the total remaining surface of said wall corresponding to the same level of partial wear of the tread. In this manner, the effect of the connecting elements on the rigidity is at a maximum when the tread is new, but decreases gradually with the increase in rigidity of said tread resulting from wear.

On the other hand, tire rolling tests have shown that the sculpture according to the invention results in:

an improvement in wear by reducing the sliding of the rubber against the road, be it at the moment of emerging from the zone of contact for transverse cutouts or when cornering for circumferentially oriented cutouts;

an improvement in the fatigue strength of the base of the cutouts (that is to say, the part of the cutouts which is radially farthest to the inside of the tread);

lower retention of stones in the cutouts provided with connecting elements.

It is also noted that the draining ability of the tire pattern according to the invention, that is to say its ability to evacuate the water present on the road, is sufficient whatever the level of wear of the tread, which is a particularly attractive advantage for the user.

In order to obtain long-lasting efficiency of a tread pattern according to the invention with time when traveling on a wet road, the length of active ridge of the pattern in the imprint corresponding to each level of wear is preferably defined as being at least 50% of the length of active ridge on the rolling surface of the tread in the new state.

In order that the tread maintains sufficient shearing and flexural strength when subjected to the contact stresses, and this despite the presence of a very large number of cutouts, it is judicious to arrange the connecting element(s) of each of said cutouts such that the distance between the ridge closest to the rolling surface in the new state and the points of the contour of the intersection surface of said element on said wall is at most 60% of the height h of the cutout and preferably between 40% and 60%.

Another substantial improvement of the pattern of a tread according to the invention consists in effecting a plurality of cutouts provided with a large number of connecting elements distributed fairly regularly in each of the cutouts so as to ensure good regularity of the effect induced on the rigidity of the rubber elements defined by the walls of the cutout.

A tread in accordance with this latter improvement comprises a plurality of cutouts, each cutout being defined by the space defined principally between two opposing walls, said walls being perpendicular to or oblique to the rolling surface, and having a depth, measured as the distance in a radial direction of the points of the contour of said cutout which are farthest from the rolling surface of the new tire, at most equal to the thickness E of the tread. The tread is characterized in that:

the two main walls of at least one cutout located in the part of the tread affected by the loading on the ground of the tire during travel are connected by a plurality of rubber connecting elements, said connecting elements having with each of the walls a connection surface $S_E$, said connection surface $S_E$ on each of the walls being at least 10% of the surface $S_T$ of said wall, each connecting element having with each of the walls an intersection surface $S_E$ at most equal to $E \times E/20$, and in that the surface $S_G$, defined by the geometric contour L of minimum length and a enveloping the entire connection surface $S_E$, is at least 70% of the surface $S_T$ of said wall.

This tread imparts particularly homogenous and regular performance to the tire, no matter what the degree of wear of said tread.

Another object of the invention is to propose a method for the production of a tread provided with a plurality of cutouts, said cutouts being provided with at least one connecting element. It clearly emerges that the conventional methods of molding cutouts are not suitable for producing such tread patterns readily and with sufficient precision, because the fact of arranging at least one connecting element beneath the rolling surface of the tread results in it being impossible to demold said tread when a conventional molding process is used which uses metal blades to mold incisions.

One object of the invention is to propose a method for obtaining a tread for a tire, comprising at least one cutout, the main walls of which are connected by at least one connecting element, eliminating the problems of demolding. The method for the production of a tread of thickness E according to the invention comprises the following steps:

a) production of inserts in an appropriate material, said inserts having the general shape of the cutouts desired in the tread, and of thickness equal to the width of said cutouts;

b) removal of material in each insert to obtain (an) orifice(s) in a distribution selected beforehand, each orifice having a shape equivalent to the shape of a connecting element;

c) insertion of the inserts produced in the preceding stages into a strip of rubber;

d) molding under pressure in a mold having the dimensions of the tread desired, during which the rubber mix of the tread, which has become more fluid, fills the orifices of the inserts so as to form connecting elements between the rubber walls adjacent to each insert;

e) vulcanization of said rubber strip followed by demolding.

Of course, this tread may be made in the form of a strip of predetermined length, or in the form of a closed ring intended to be placed radially on the outside of the blank of a tire during the manufacture thereof or on a tire being recapped.

One variant of the method which has just been described may consist in effecting steps a) to c) and placing the non-vulcanized, non-molded rubber strip on a tire blank before proceeding with the molding and vulcanization of the tire and tread assembly thus assembled.

More generally, this method, which consists in inserting inserts into a strip of rubber, may also be applied in the case of the manufacture of a tread comprising a plurality of inserts without orifice in order to mold a plurality of incisions which do not comprise connecting elements.

So as to facilitate the insertion of the inserts into the rubber strip, another variant of the method described is proposed, consisting in producing, in a non-vulcanized rubber strip, cutouts of dimensions substantially equal to the dimensions of the cutouts provided with at least one connecting element between the walls of said cutouts.

The material forming the inserts and filling the cutouts which are provided with at least one connecting element is selected so as to be able to be eliminated at least in part, that is to say, at least close to the rolling surface when new, and gradually during traveling in order permanently to maintain a great length of ridges.

It has been found that paper pulp is a filling material particularly suited to this use, because this material is characterized by very low cohesion once it is in the presence of water for a sufficient time, and therefore has the advantage of being able to be eliminated gradually during travel of the tire, or alternatively of being able to be eliminated after having been put in the presence of water and before any travel, all the more easily when the cutouts provided with at least one connecting element have a thickness of at least 0.4 mm.

One variant of this method consists in selecting as the material composing the inserts a material having a melting point sufficiently close to the vulcanization temperature of said tread to become fluid only towards the end of the duration of said vulcanization, taking into account the gradual increase in temperature of the rubber forming said tread, so as to permit the removal of said filling material, for example by suction or by blowing after vulcanization of said tread.

Preferably, the filling material is an alloy having a low melting point, having the advantage of being rigid during the shaping phase of the tread and during the vulcanization phase before becoming fluid at the end of the vulcanization of the tread so as to permit the removal of said alloy and possibly recycling it for a similar use.

The method which has just been described may also be succeeded by a grinding operation affecting virtually only the surface of the new tread and intended to make a plurality of ridges appear very distinctly on the rolling surface of said tread. Another way of obtaining a good surface state immediately on emerging from the mold may consist in arranging all the cutouts provided with at least one connecting element beneath the rolling surface of the tread and molding said tread in a mold comprising a plurality of relief elements intended to mold a plurality of cutouts on the rolling surface and the depth of which is slightly greater than the smallest of the distances between the cutouts provided with at least one connecting element of the rolling surface. In this way, the tread, as it wears down, will gradually reveal a plurality of cutouts beneath the rolling surface of said new tread.

DESCRIPTION OF THE DRAWINGS

The invention will be readily understood with reference to the appended drawings, which represent only particular embodiments and are not intended to be limitative.

DESCRIPTION OF PREFERRED EMBODIMENTS

Figure 1:
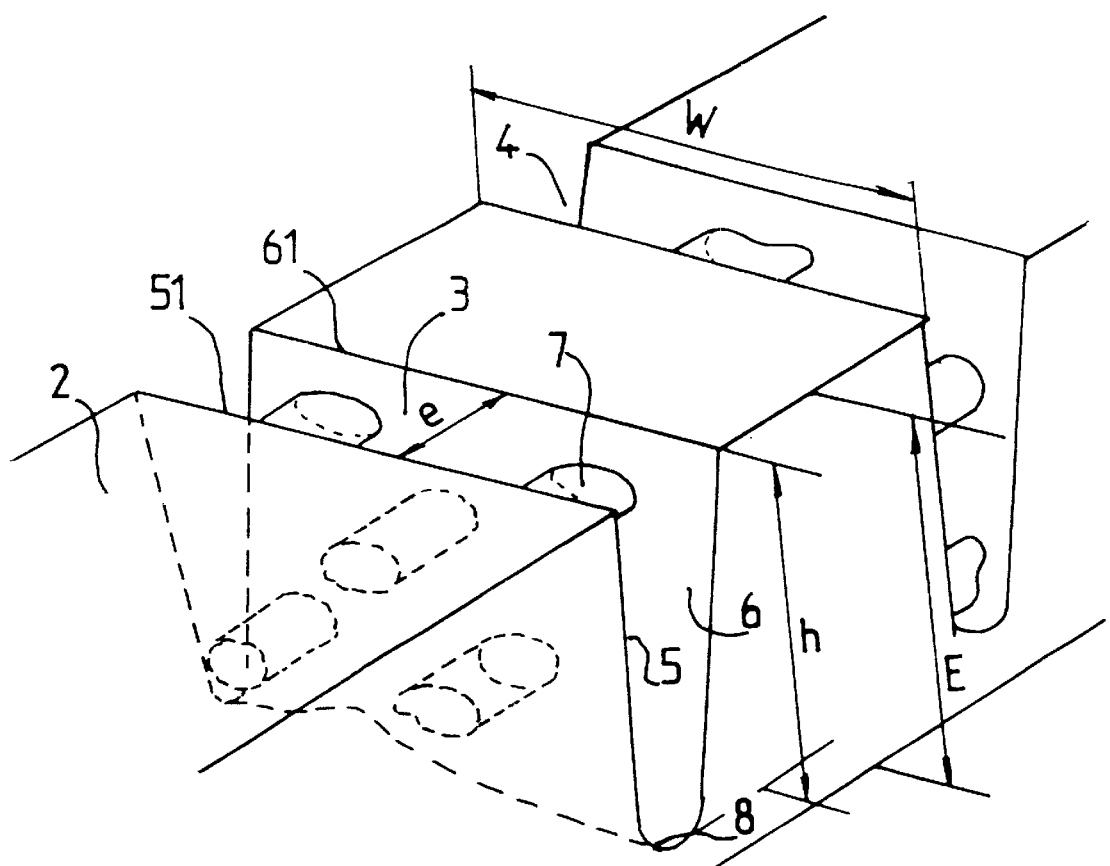
FIG. 1 is a diagram of a section through part of a tread according to the invention.

The tread 1 shown partially in the direction of its length in FIG. 1 has a thickness E and a width W. One of the outer walls of said strip is intended to form the rolling surface 2 of a tire provided with said tread; this tire may be either a new tire or a renovated tire, that is to say a tire which has traveled so far that its tread has become worn to such an extent that provision of a new tread has become necessary.

A plurality of cutouts 3, 4 are made in the tread 1 so as to extend over the entire width W of said tread 1. The cutout 3 is defined by two flat main walls 5, 6 perpendicular to the rolling surface 2 and spaced apart by an average distance e equal to the width of the cutout 3. The two walls 5, 6 defining the cutout 3 are connected at the radially innermost points 8 of the cutout with respect to the rolling surface 2. The intersection of the walls 5, 6 with the rolling surface 2 determines rubber ridges 51 and 61, respectively, one function of which is to cut the film of water which may exist between the tread and the road.

The cutout 3 is provided with five rubber connecting elements 7 which connect the walls 5 and 6 of said cutout, said connecting elements making it possible to keep said walls at a virtually constant distance, avoiding both the opening and the closure of the cutout 3.

Figure 2:
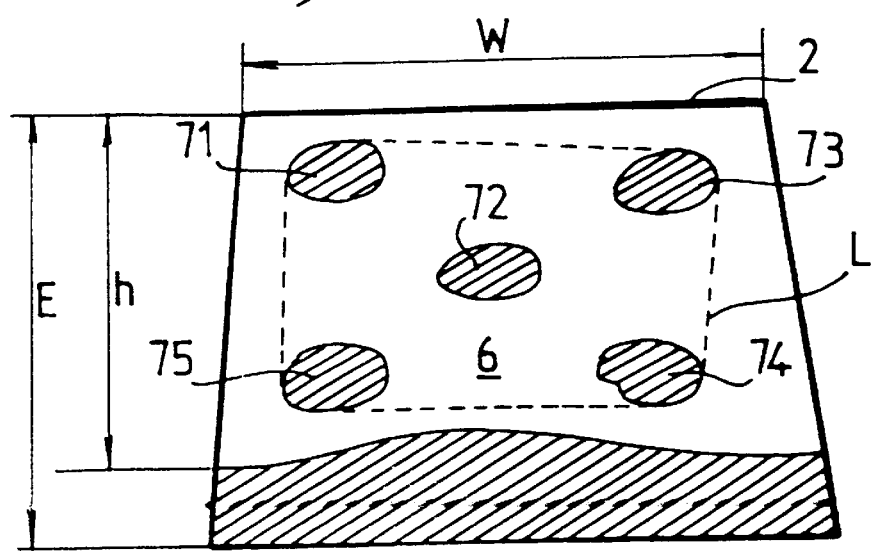
FIG. 2 is a diagram of a section through the tread of FIG. 1 taken along a wall of a cutout provided with connecting elements.

FIG. 2 shows a cross-section through the tread 1 of FIG. 1 effected along the wall 6 of the cutout 3. There can be seen, distributed fairly uniformly along the wall 6, the intersection surfaces 71, 72, 73, 74, 75 of the connecting elements 7 with the wall 6, the total of said surfaces forming the total intersection surface $S_E$. In the present case, all the connecting elements have their intersection surfaces 71, 72, 73, 74, 75 entirely located beneath the rolling surface 2 and at a radial distance from said surface which is less than the depth h of the cutout. Furthermore, the total connection surface $S_E$ is at most 80% of the surface $S^G$ defined by the geometric contour L (in broken lines) of minimum length constructed on the wall 6 and enveloping all the intersection surfaces 71, 72, 73, 74, 75 of the connecting elements 7 with the wall 6. These three conditions when combined make it possible to obtain a tread pattern comprising very numerous cutouts over relatively great depths compared with the thickness of the tread, said cutouts forming numerous rubber ridges on the rolling surface 2, said pattern thus produced preserving sufficient rigidity to resist the stresses due to loading and traveling.

In known manner, the main walls of the cutouts may be plane or alternatively curved.

Advantageously, and in order to obtain an optimum effect, the tread comprises a plurality of cutouts provided with at least one connecting element and each surface $S_G$, defined by the geometric contour L of minimum length and enveloping the total connection surface $S_E$ on one wall of the cutout, is at least 15% of the surface of the corresponding wall $S_T$.

The relative position of the connecting elements of one and the same cutout is determined so as to maintain for said cutout a great length of active ridge to come into contact with the ground, and this whatever the level of wear of the tread.

Figure 3:
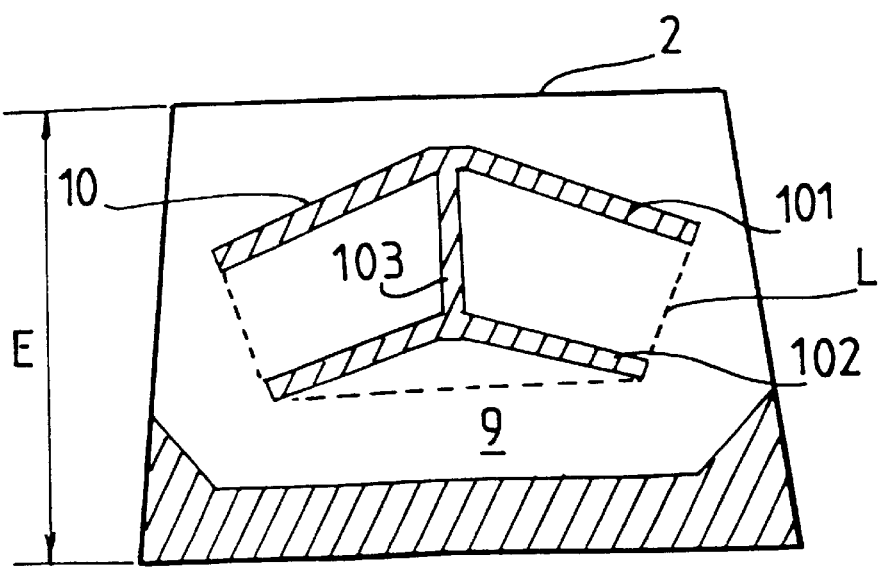
FIG. 3 is a diagram of a section through a tread taken along a wall of a cutout provided with a single connecting element according to the invention.

Another possible embodiment is shown in FIG. 3, which shows a diagram of the section through a rib of a tread 1 effected along a wall 9 of a cutout provided with a single connecting element 10 which extends between the main walls defining said cutout. This element 10 is composed of two branches 101, 102 oriented in the direction of the width of the incision and connected together by a third branch 103 oriented in the direction of the thickness of the tread. The contour L shown in dashes corresponds to the contour of minimum length enveloping the total connection surface of the single element and passing through the ends of the branches 101 and 102. It is implicit that the spirit of the invention is preserved when the branch 103 connecting the branches 101 and 102 is extended as far as the rolling surface 2, since a single volume corresponding to the cutout is created.

Figure 4:
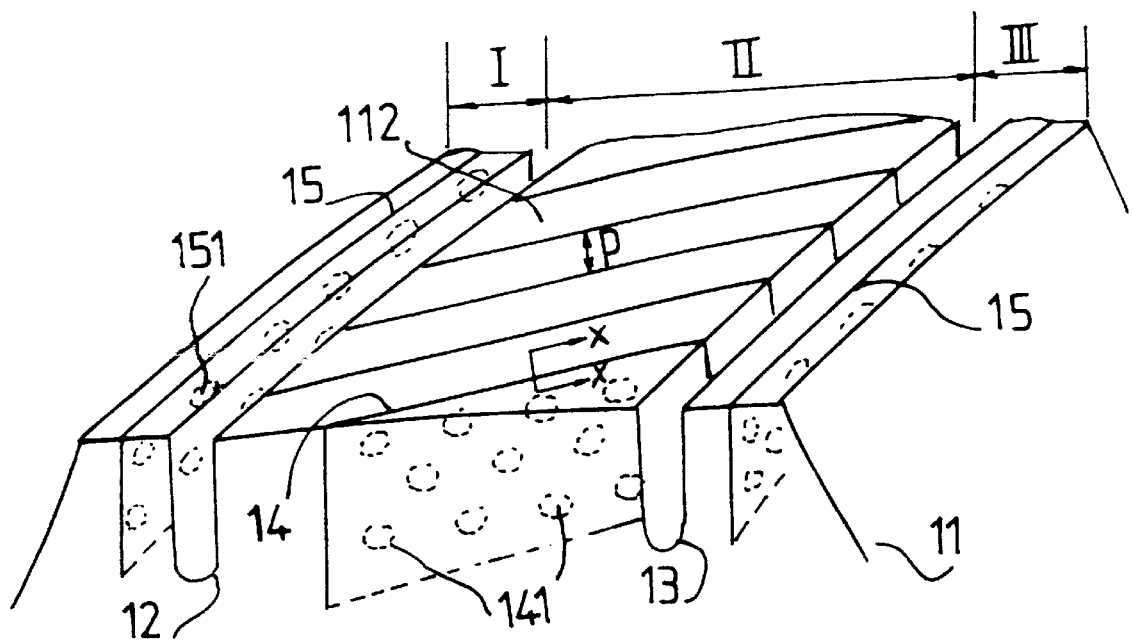
FIG. 4 shows a tread of a tire comprising incisions provided with connecting elements, said incisions being oriented firstly in the circumferential direction and secondly in the transverse direction.

FIG. 4 shows in part a tread 11 of a tire comprising incisions oriented in the circumferential direction and incisions oriented in the transverse direction, each of said incisions being provided with connecting elements and opening on to the rolling surface 112 of said tread. The tread 11 is divided axially into three annular regions marked I, II, III, the median region II being separated from the two edge regions I and III by circumferentially oriented grooves 12 and 13. So as to improve the adhesion performance of the tire fitted with such a tread, without for all that being handicapped by traveling noise, a plurality of incisions 14 of small width oriented essentially transversely are provided in the median part II, said incisions 14 opening on either side of the part II into the grooves 12 and 13. These incisions 14 of depth h and of width e of at least 0.1 mm are arranged regularly at an average pitch p such that the ratio h/(p−e) is more than 0.9. Thus, it is possible to have a high density of ridges in the contact imprint without impairing the mechanical characteristics of the part II.

In the edge parts I and III, there is provided at least one incision 15 oriented substantially in the circumferential direction. All the incisions of transverse orientation 14 and the circumferential incisions 15 are provided with a plurality of connecting elements 141 and 151 respectively, connecting the main walls forming said incisions.

"Oriented substantially transversely" is understood to mean that the center axes of the traces of the incisions on the rolling surface 112 form an angle of at most 45° with the transverse direction of the tread. "Oriented substantially circumferentially" is understood to mean that the center axes of the traces of the incisions on the rolling surface form an angle of at least 75° and at most 90° with the transverse direction of the tread. The center axis of the trace of a cutout on the rolling surface of a tread corresponds to the average direction evaluated between the points of the ridges of said cutout on the rolling surface using a method of the least-error squares of the distances.

In this manner, it is possible to obtain a tire having good adhesion performance in the longitudinal direction of the tread owing to the presence of incisions oriented transversely in the part II and adhesion performance in the transverse direction owing to the presence of at least one incision oriented virtually circumferentially in the parts I and III, said incisions being provided with connecting elements connecting their walls.

It is also possible to provide connecting elements also connecting the walls defining the circumferential grooves separating the part II from parts I and III.

Figure 5:
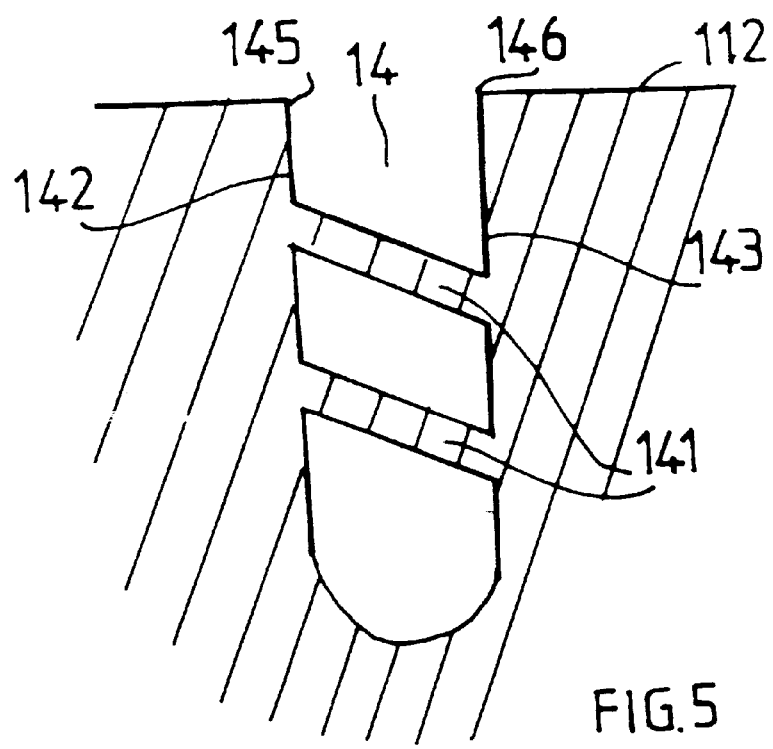
FIG. 5 shows the section along XX of the tread of FIG. 4, showing a cutout provided with connecting elements inclined relative to the rolling surface of said tread.

After partial wear of the tread according to the invention, at least one connecting element of a cutout appears on the rolling surface and accordingly reduces the lengths of the ridges 145, 146 formed by each of the main walls of said cutout with the rolling surface 2. In order to alleviate this effect, and as shown in FIG. 5, corresponding to a section along XX through the tread shown in FIG. 4, it is judicious to arrange each connecting element 141 between a first main wall 142 and a second main wall 143 of the cutout 14 such that said element forms an angle other than 90° and preferably between 30° and 70° with the line perpendicular to the rolling surface of the new tread.

Another manner of overcoming the disadvantage which has just been mentioned, and also in order to avoid the localization of wear on certain regions of a tread according to the invention, it is advantageous, as is the case for the incisions 14 localized in the median part II of the tread shown in FIG. 4, to provide an offset in the radial direction of the position of the connecting elements between any two adjacent cutouts of substantially identical orientation. Thus, the position of the rubber ridges formed by the intersection of the walls of the cutouts is distributed randomly. The fact that the connecting elements arrive at the rolling surface after wear in a more or less offset manner makes it possible permanently (that is to say, during the entire period of use of the tire) to maintain a great length of ridges in the region of the rolling surface affected by the contact with the road, and makes it possible to effect beneficial blurring both of the wear (the appearance of abnormal, that is to say localized, wear, is avoided), and of the traveling noise.

In the case of use requiring essentially adhesion characteristics in the longitudinal direction, it is possible to provide solely a plurality of cutouts provided with at least one connecting element, the center axis of the traces of said cutouts on the rolling surface of the tire forming an angle of at most 45° with the transverse direction of the tread. Conversely, in the case of use requiring essentially adhesion characteristics in the transverse direction, it is possible to provide a plurality of cutouts provided with at least one connecting element, the center axis of the traces of said cutouts on the rolling surface of said tread when new forming an angle of at least 75° and at most 90° with the axial direction of the tread. A comparable result is obtained by producing a single continuous cutout oriented at an angle close to 90° with the transverse direction such that the center axis of the trace of the cutout on the rolling surface forms a helix, because everything takes place in the zone of contact with the road as if the tread were provided with a plurality of cutouts virtually oriented in the circumferential direction.

The cutouts provided with at least one connecting element may be perpendicular to the rolling surface or alternatively part of them form an average angle of at most 20° with the direction perpendicular to the rolling surface of the tread when new, so as to increase the efficiency of the rubber ridges in certain uses so as to be able better to transmit a driving or braking force according to the direction of orientation of the inclination of said cutout which is selected.

Figure 6:
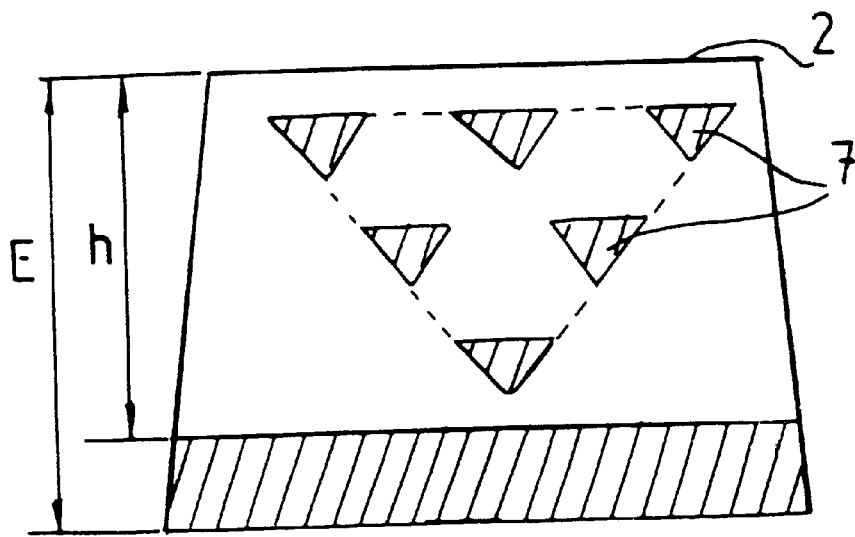
FIG. 6 shows a variant of the layout of the connecting elements of a cutout.

Since the rigidity of the pattern of a tread increases with the reduction in its thickness resulting from the wear of said tread, it is judicious furthermore to provide that for at least one cutout, located in the part of the tread affected by the loading of the tire and provided with at least one connecting element, the ratio $T_{P=SP}/S_T$ decreases substantially regularly with the wear of the tire at least starting from a predetermined partial level of wear, $S_P$ representing, on one of the walls of said cutout, the connection surface remaining after partial wear of the tread and $S_T$ representing the total surface of said wall corresponding to the same level of partial wear of the tread. In this context, FIG. 6 shows, viewed in a transverse section, a wall of a cutout provided with connecting elements 7 arranged in rows virtually parallel to the rolling surface 2, the number of connecting elements 7 per row increasing as the rolling surface 2 is approached.

Figure 7:
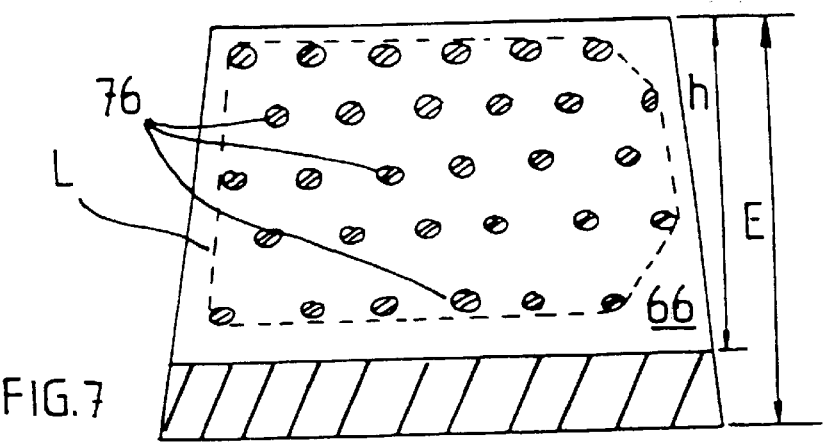
FIG. 7 shows a diagram of a section through a tread effected along a wall of a cutout provided with a large number of connecting elements.

FIG. 7 shows an advantageous arrangement in terms of connecting the main walls of one and the same cutout of a tread. In this Figure, there can be seen, regularly distributed over a main wall 66 of a cutout, a plurality of surfaces of intersection 76 of connecting elements with said wall such that the density of connecting elements is relatively great (that is to say there is a large number of elements per surface of wall). In the present case, the surface $S_G$ defined by the contour L of minimal length and enveloping all the intersection surfaces of the connecting elements is about 90% of the total surface of the wall 66, while the connection surface $S_E$ represents only 40% of the total surface. An optimum effect on the rigidity of the tread is achieved when the connecting elements are regularly distributed over the walls of each cutout.

It may be advantageous to provide additional rubber elements connected to only one of the walls of a cutout provided with connecting elements to prevent the regions of the walls of said cutout located between said connecting elements from moving towards each other.

Figure 9A:
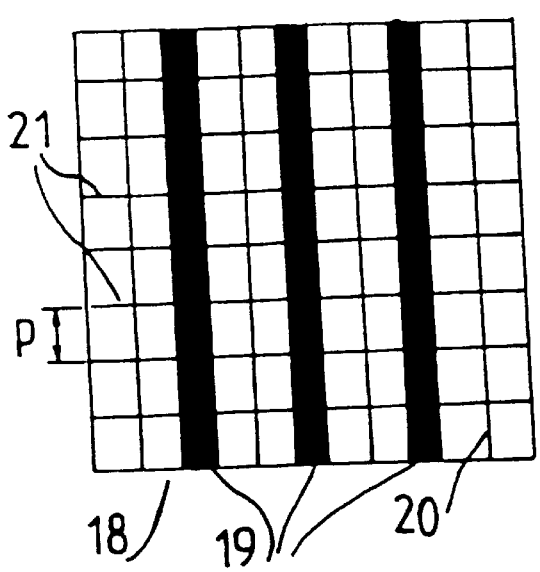
FIG. 9A shows a variant of a tread pattern according to the invention which has undergone rolling tests.
Figure 9B:
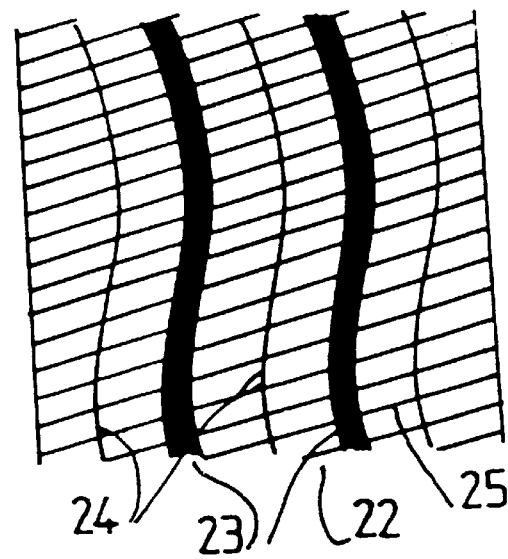
FIG. 9B shows another pattern according to the invention which has undergone rolling tests.

Rolling tests and rolling simulation tests have been carried out with heavy-vehicle tires of dimension 215/75 R 17.5 comprising treads according to the invention. FIG. 9 shows a diagram of two types of tread pattern tested. FIG. 9-A corresponds to the variant A of a tread 18 comprising a plurality of incisions 21 of width 0.1 mm, oriented transversely and spaced apart circumferentially by an average pitch p of 15 mm; this variant furthermore comprises three circumferential grooves 19 of width 5 mm which axially divide the tread into four parts, each of said parts again being divided into two by a circumferential incision 20 of width 2 mm. All the cutouts are of the same depth, 13.5 mm. FIG. 9-B corresponds to the variant B of a tread 22 comprising a plurality of incisions 25 of width 1 mm, oriented in a direction forming an average angle of 15° with the transverse direction of the tire and spaced apart by an average pitch p of 10 mm; this variant B furthermore comprises two substantially circumferential grooves 23 of undulating shape of width 10 mm which axially divide the tread into three parts, each of said parts again being divided into two by a circumferential incision 24 of width 2 mm, said incisions following the same profile as the grooves. All the cutouts of the two variants A and B are of identical depth, equal on average to 13.5 mm.

Figure 10:
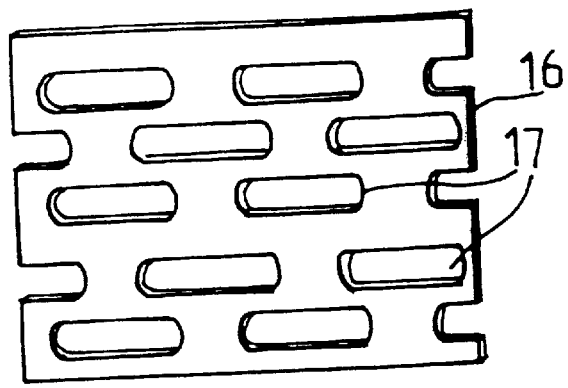
FIG. 10 shows a insert used for producing variants A and B of FIG. 9.

Variants A and B have been produced in the following manner: after having cut out along the traces of the desired incisions a non-vulcanized rubber strip of suitable width and length, inserts are produced in sheets of paper of thickness 0.1 mm for variant A and in sheets of card of thickness 1 mm for variant B, in a number equal to the number of equivalent incisions and dimensions. Each insert is then cut out so as to produce a plurality of orifices, the shape of which corresponds to the shape of the sections of the connecting elements of the incisions. FIG. 10 shows one such insert 16 provided with a plurality of orifices 17 of virtually rectangular shape; these orifices, of dimension 2×5 mm may be obtained, for example, by means of a laser cutting process or by punching. Then these inserts 16 are placed in the cutouts made in the non-vulcanized tread.

This tread is then placed on a non-vulcanized tire blank before being molded with the tire in a vulcanization mold. During the vulcanization of said tread, the rubber of the tread passes through the inserts at the locations of the orifices, forming the connecting elements of the cutouts, said cutouts being filled with the material making up the inserts. In order to obtain the variants A and B, the grooves and circumferential incisions without connecting elements have been made by cutting after manufacture of the tires comprising the treads. Of course, the additional grooves and incisions may be produced by the method according to the invention.

In the individual case, the tires selected were tires of heavy-vehicle type of dimension 215/75 R 17.5, the incisions provided with connecting elements of which had a connection rate $T_P$ equal to 45% and for which the ratios $S_E/S_T$ and $S_E/S_G$ were equal to 45% and 40%, respectively. The groove ratios of the rolling surfaces in the new state of the two variants A and B were 15% and 18%, respectively ("groove ratio" is understood to mean the ratio between the surface of the cutouts on the rolling surface and the total surface of said rolling surface).

Adhesion tests were carried out with a heavy vehicle equipped with an additional wheel for measurement, said wheel being fitted with a tire according to variant A or variant B. In this test, the appearance of sliding of the tire relative to the road is determined for a given speed and under the action of a given braking force; this test is carried out on a test track having a smooth coating and on which there is a layer of water of a thickness of about 1.5 mm. A tire of type XZE, of the same dimension and having a groove ratio of 18%, was used as reference basis. The groove ratios of the variants A and B are comparable to that of the tire selected as a reference.

Unexpectedly, the results of the adhesion tests showed that, compared with the reference tire, the tires of variant A were about 15% better than the reference tires, while the tires of variant B were greatly superior to the reference tires, by at least 30%. The difference in performance between variants A and B can be explained in part by the difference in width of the incisions.

On the other hand, tests measuring the noise emitted during travel under conditions defined by ISO Standard 362 showed, equally surprisingly, that the level of noise emitted by a tire provided with a tread according to the invention was reduced by at least 3 dbA and at least 2 dbA for variants A and B respectively, compared with the reference tires.

While it is known, in the case of conventional patterns for heavy-vehicle tires, that obtaining a good noise performance is always accompanied by a reduction in the adhesion performance on smooth ground, these tests have shown that, thanks to a tread pattern according to the invention, it is possible to obtain a very significant improvement in performance, both in terms of adhesion and traveling noise.

The tread according to the invention and the manufacturing method for such a tread make it possible to obtain, with a low groove ratio, that is to say, a ratio between the surface corresponding to the cutouts and the total surface of said strip which is intended to be in contact with the ground, a performance which is at least equivalent to a conventional tread having a higher groove ratio; the large number of rubber ridges, compared with the fact that the rigidity of the tread is not substantially affected, compensates for the difference in the groove ratios.

It should be noted that the presence of connecting elements in the cutouts makes it possible for the tread to retain a rigidity which results in a loss of rolling resistance (energy dissipated during travel of a tire equipped with said tread) which is distinctly less than that obtained with the same tire, the connecting elements of which have been removed.

After manufacture of the tires provided with a tread according to the invention, it is possible to eliminate the inserts partially, that is to say, solely in the vicinity of the rolling surface, so as to disengage the ridges from the incisions on the rolling surface. Subsequently, the material forming the inserts is eliminated as the tread becomes worn.

Figure 8:
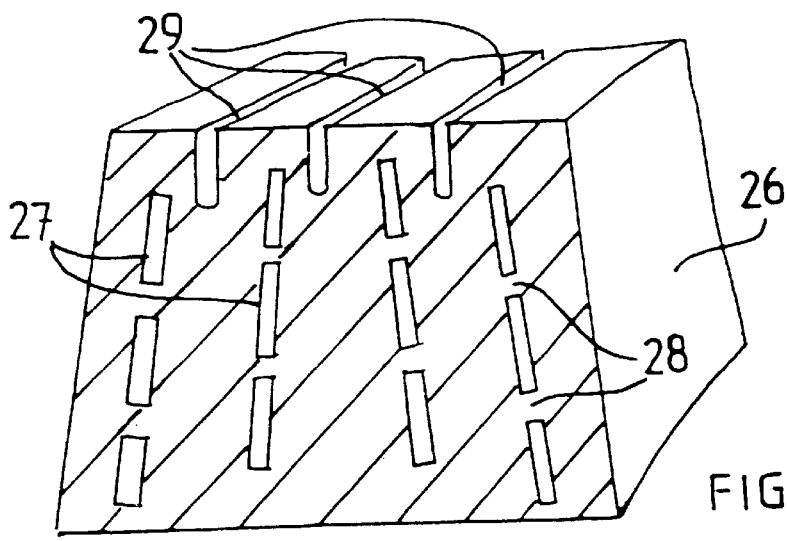
FIG. 8 shows, viewed in section, a variant of a tread comprising a plurality of incisions provided with a plurality of connecting elements beneath the rolling surface of said new tread.

So as to obtain a better appearance of the tread when it emerges from the vulcanization mold for said tread, it may be contemplated to provide for the cutouts provided with connecting elements to be entirely located beneath the rolling surface of the new tread, and for a plurality of cutouts without connecting elements and of a depth at least slightly greater than the distance between the rolling surface of the cutouts provided with connecting elements to be provided on said rolling surface. Such a configuration can be seen in FIG. 8, which shows a diagrammatic section through a tread 26 when new, comprising a plurality of incisions 27 provided with a plurality of connecting elements 28. The rolling surface is provided with a plurality of cutouts 29 of low depth intended to play an active role during the initial use of the tread. After partial wear of the tread, the incisions 29 disappear, leaving the subjacent incisions 27.

One variant embodiment of the inserts consists in using a material in the form of a woven fabric comprising warp and weft threads, said fabric having the property of resisting the vulcanization of said strip and being able to be eliminated gradually during the travel of the tire, the spaces defined by the warp and weft threads permitting the molding of the connecting elements of said cutout. The material forming the inserts may also be formed of one or more threads forming a network of threads which can be eliminated completely after vulcanization of the tread or alternatively gradually during travel.

Figures 11A, 11B:
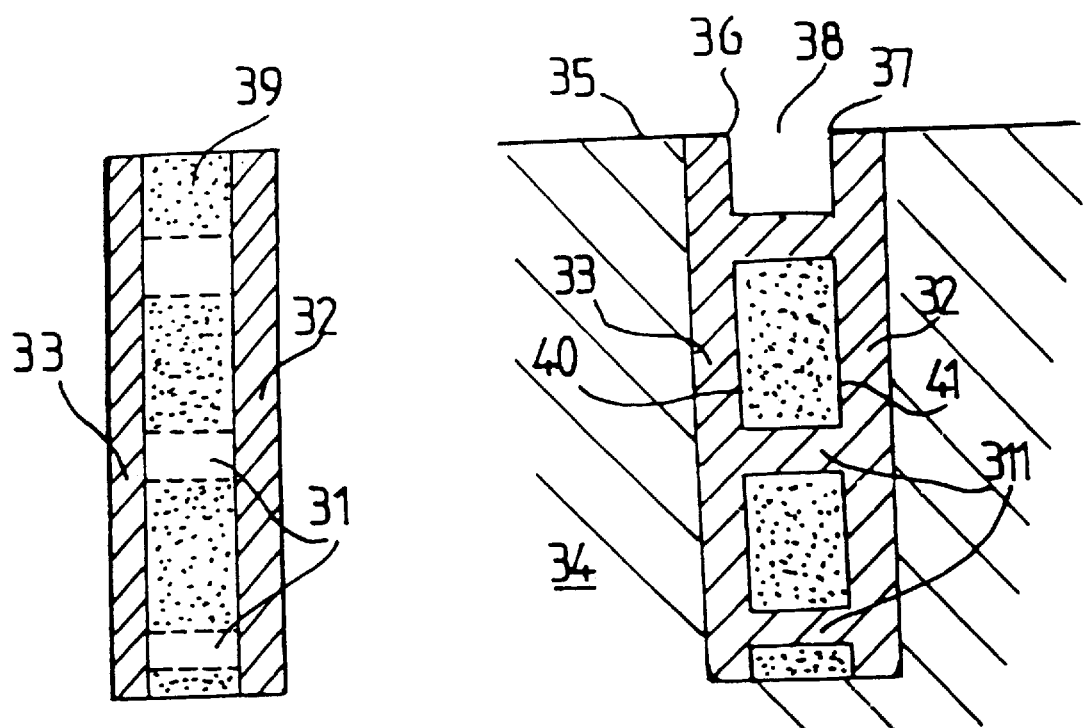
FIGS. 11A and 11B show two stages in the manufacture of a tread in which the main walls and connecting elements are made of a rubber mix of a different type from the rubber forming the tread.

The manufacturing method according to the invention furthermore makes it possible to effect cutouts, the walls of which are covered with a rubber mix other than the mix forming the rest of the tread, as illustrated in FIG. 11, in the particular case of an incision provided with connecting elements; of course, the method which is described for forming this type of incisions can equally well be applied to an incision not provided with connecting elements.

FIG. 11-B shows a variant of a cutout 38 provided with a plurality of connecting elements 311 produced by following the following steps:

at least one insert 39 is produced which comprises a plurality of orifices 31 (visible in FIG. 11-A);

a stack is formed by covering at least one insert on each of its two main faces with two layers of raw rubber 32, 33, each layer having a thickness close to the thickness of the insert;

a pressure is exerted on either side of the stack thus formed, so as to apply each layer 32, 33 more or less strongly against the walls of the insert and so as to force each layer to penetrate into the orifices until they come into contact with each other; the contacts thus formed facilitate the handling of the insert coated with a rubber mix before placing it in the cutout provided in the raw tread;

each insert is inserted into a non-vulcanized rubber strip;

the strip thus formed is then vulcanized and molded in a suitable mold; this mold may comprise relief elements projecting on its molding surface for molding cutouts in the form of grooves or incisions.

One variant of this method consists, first of all, in forming a stack composed of a non-holed insert and covered on its two faces with two layers of raw rubber and, secondly, holing said stack according to its thickness before inserting said stack into a strip of raw rubber and finally molding and vulcanizing said strip. In this manner, the rubber forming the tread occupies each orifice, and forms each connecting element of the cutout thus molded.

After vulcanization, the material forming the insert 39 can be eliminated, at least at the surface, as can be seen in FIG. 11-B. The coating of the insert is effected with rubber mixes which may be of the same nature as the mix forming the tread, or alternatively of a different nature. A mix of different nature will impart to the ridges of the cutout better resistance to abrasion resulting from the contact with the road. It may also be envisaged to use two layers of rubber mixes of different nature on either side of the insert in order to make allowance, in particular, for a preferred direction of travel of the tire. Furthermore, the layers may have different thicknesses greater than the thickness of the insert. Each layer of rubber covering the insert may be formed of one or more layers of mix.

It may be advantageous for at least one cutout provided with at least one connecting element to have at least one connecting element formed of a rubber mix of different nature and mechanical properties from the mix forming the tread.

All the variants described in the present application may be combined according to the object desired, without for all that departing from the spirit of the invention. For example, a tire may comprise both a plurality of incisions, some of which are provided with connecting elements and the others not, said incisions being formed, for example, in accordance with one of the methods which have just been described.

The field of application of the present invention relates to all types of tires, and in particular to highway-type tires, whether they be intended to be fitted on vehicles of the type passenger cars, vans, heavy vehicles and in particular tires for subway trains. More specifically, the tires intended to be fitted on the driving axles of heavy vehicles have considerably improved adhesion and noise properties once they are provided with a tread according to the invention. The application of a tread pattern according to the invention to tires for civil engineering machinery, and more particular to vehicles of the "dumper" type, is beneficial since it makes it possible to produce a tread having a plurality of cutouts while ensuring sufficient rigidity for said tread under the loading forces and the driving or braking forces.

In the field of heavy-vehicle and passenger-vehicle tires, the best performances are obtained when at least 80% of the incisions provided with connecting elements according to the invention each have a width of at least 0.1 mm and at most 2 mm.

A tread according to the invention may also be placed on a tire blank before being vulcanized with said tire blank in an appropriate vulcanization mold.

Finally, a tread according to the invention may comprise a plurality of rubber blocks defined by grooves, said blocks comprising at least one incision itself provided with at lest one connecting element between the main walls of said incision; the grooves may furthermore be provided with connecting elements so as to produce a high-performance tread pattern.

We claim:

1. A tread of thickness E for a tire, provided with a rolling surface, said tread being provided with a plurality of cutouts, each cutout being defined by the space defined principally between two main opposing walls, said walls being perpendicular to or oblique to the rolling surface, and having a depth h, measured as the maximum radial distance between the points of the walls of said cutout which are radially farthest away, at most equal to the thickness E of the tread, characterized in that:

the two main opposing walls of at least one cutout located in the part of the tread affected by the loading on the ground of the tire during travel are connected by at least two rubber connecting elements, the connecting elements having with each of the walls a total interconnection surface $S_E$, said total interconnection surface $S_E$ on each of the walls being at least 10% of the total surface $S_T$ of said wall, all the points of the outer contour of the surface of intersection of at least one connecting element with one of the walls are located at a distance from the rolling surface which is less than the depth of the cutout, and, on each of the walls, the total interconnection surface $S_E$ is at most 80% of the surface $S_G$, the surface $S_G$ being equal to the surface, measured on said wall of the cutout, defined by a geometric contour L of minimum length and enveloping all the interconnections.

2. A tread according to claim 1, characterized in that, for at least one cutout comprising at least two connecting elements, the surface $S_G$ defined by the geometric contour L of minimum length and enveloping the total connection surface $S_E$ on one main wall of the cutout is at least 15% of the surface $S_T$ of the corresponding wall.

3. A tread according to claim 2, characterized in that all the cutouts comprising at least two connecting elements are entirely located beneath the rolling surface of the tread when new and in that, furthermore, there are provided on the surface of the tread of the new tire cutouts the depth of which is greater than the smallest of the distances between the cutouts comprising at least two connecting elements and the rolling surface of the tread of the tire when new.

4. A tread for a tire according to claim 1, characterized in that it comprises a plurality of cutouts provided with at least two connecting elements, the center axis of the traces of said cutouts on the rolling surface of the tire forming an angle of at most 45° with the transverse direction of the tread.

5. A tread for a tire according to claim 1, characterized in that it comprises a plurality of cutouts provided with at least two connecting elements, the center axis of the trace of each of cutouts on the rolling surface of said tread when new forming an angle of at least 75° and at most 90° with the transverse direction of the tread.

6. A tread for a tire according to claim 1, characterized in that it comprises, on at least one of its edges (I, III) in the transverse direction, at least one cutout provided with at least two connecting elements, said cutout being oriented such that the center axis of the trace thereof on the rolling surface forms an angle of at least 75° and at most 90° relative to the transverse direction of the tread, and in that the median part (II) of the tread comprises a plurality of cutouts provided with at least two connecting elements, said cutouts being oriented such that the center axis of their traces on the rolling surface forms an angle of at most 0° and at most 45° relative to the transverse direction of the tread.

7. A tread for a tire according to claim 1, characterized in that at least one of the cutouts located in the part of the tread affected by the loading of the tire and provided with at least two connecting elements has, on a surface parallel to the rolling surface and located radially inside said surface, a trace, the orientation of the center axis of which is different from the orientation of the center axis of the trace of said cutout on the rolling surface of the new tread.

8. A tread for a tire according to claim 1, characterized in that at least one of the cutouts provided with at least two connecting elements forms an average angle of at most 20° with the direction perpendicular to the rolling surface of the tread when new.

9. A tread for a tire according to claim 1, characterized in that for at least one cutout, located in the part of the tread affected by the loading of the tire and provided with at least one connecting element, the ratio $T_P=S_P/S_T$ decreases virtually regularly with the wear of the tire at least starting from a predetermined level of wear, $S_P$ representing, on one of the main walls of said cutout, the connection surface remaining after partial wear of the tread and $S_T$ representing the total surface of said wall corresponding to the same level of partial wear of the tread.

10. A tread for a tire according to claim 1, characterized in that each connecting element between a first main wall and a second main wall of at least one cutout forms an angle other than 90° with the direction perpendicular to the surface of the new tread, so as to maintain a great length of ridge on the rolling surface, whatever the degree of wear of the tread.

11. A tread for a tire according to claim 1, characterized in that additional rubber elements are provided in at least one cutout to prevent the walls of said cutout from moving towards each other, these additional elements being connected only to a single one of the main walls of said cutout.

12. A tread for a tire according to claim 1, wherein said plurality of cutouts to be provided with connecting elements are, at least in part, filled by at least one filling material prior to vulcanization which filling material can be eliminated after vulcanization of said tread.

13. A tread for a tire according to claim 12, characterized in that the filling material has a melting point lower than and close to the vulcanization temperature of the tread.

14. A tread for a tire according to claim 12, characterized in that the filling material is a material based essentially of fibers.

15. A tread for tire according to claim 14 in which the fibers include paper pulp.

16. A tread for a tire according to claim 12, characterized in that at least one cutout provided with at least one connecting element is filled with a material in the form of a woven fabric comprising warp and weft threads, said fabric having the property of resisting the vulcanization of the tread and being able to be eliminated during the travel of the tire, the spaces defined by the warp and weft threads corresponding to the passages of the connecting elements of said cutout.

17. A tread for a tire according to claim 12, characterized in that a plurality of cutouts are, at least in part, filled with a material which is in the form of threads, said material being able to be eliminated after vulcanization of the tread.

18. A tread for a tire according to claim 1, said tread being formed of a rubber mix, characterized in that, for at least one cutout provided with at least one connecting element, at least one main wall of said cutout is covered with at least one rubber mix other than the rubber mix forming the tread, and having improved properties of abrasion resistance.

19. A tread for a tire according to claim 18, characterized in that the rubber mixes covering the facing walls of one and the same cutout are of different types.

20. A tread for a tire according to claim 1, characterized in that, whatever the level of wear of said tread, the length of active ridge of the pattern in the imprint is at least 50% of the length of active ridge on the rolling surface of the tread when new.

21. A tread for a tire according to claim 1, characterized in that at least 80% of the cutouts provided with connecting elements have a width of at least 0.1 mm and at most 2 mm.

22. A tread for a tire according to claim 1, characterized in that the connecting element of a cutout which is closest to the rolling surface in the new state is arranged such that the distances between the ridge formed by one of the main walls of said cutout on the rolling surface in the new state and the points of the contour of the intersection surface of said element on said wall are between 40% and 60% of the depth h of the cutout.

23. A tire comprising a tread defined according to claim 1.

24. A tread for a tire according to claim 1 having a thickness E wherein each connecting element has with each of the walls an intersection surface at most equal to:

$$\frac{(E \times E)}{20}.$$

25. A tread for a tire according to claim 24, characterized in that the intersection surfaces of all the connecting elements are regularly distributed on the surfaces of the main walls of at least one cutout.

26. A tread of thickness E for a tire, provided with a rolling surface, said tread being provided with a plurality of cutouts oriented virtually in the same direction, each of said cutouts being defined by the space defined principally between two main opposing walls, said walls being perpendicular to or oblique to the rolling surface, and having a width e and a depth h, measured as the distance in a radial direction between the points of the walls of said cutout which are closest to the rolling surface and the points of said walls which are farthest away from the rolling surface of the new tire, at most equal to the thickness E of the tread, said cutouts being spaced by an average pitch equal to p, said tread being characterized in that:

the two main opposing walls of a plurality of cutouts are connected by at least two rubber connecting elements, the connecting elements having a total interconnection surface $S_E$ with each of the walls;

and in that the connecting ratio $T_P = S_E/S_T$, $S_T$ representing the total surface of one of the main walls of said cutout, between the main walls of one and the same cutout is at least 0.10 and at most equal to the following value:

$$\frac{1}{\left(1 + \frac{1}{3}\epsilon\right)^{0.75}} \text{ with } \epsilon = (p - e)/h.$$

27. A tread for a tire according to claim 26, characterized in that at least 40% of the cutouts affected by the loading have at least one connecting element and in that the connecting rate $T_P$ of said cutouts is at least 0.25.

28. A tread for a tire according to claim 26, characterized in that the cutouts are incisions of a width at least equal to 0.1 mm and in that the ratio h/(p-e) is greater than 0.9.

29. A method for manufacturing a tread of thickness E for a tire, said tread being provided with a plurality of cutouts provided with at least one connecting element between main opposing walls of each of said cutouts, comprising the following steps:

production of inserts of a material capable of later removal from a cutout, said inserts having a form generally the same as the cutouts desired in the tread, and of thickness equal to the width of said cutouts;

removal of material in each insert to obtain (an) orifice(s) in a distribution selected beforehand, each orifice having a shape equivalent to the cross-section of a connecting element between two main walls of one and the same cutout;

insertion of the inserts into a non-vulcanized strip of rubber;

molding, in a mold having the dimensions of the tread, and vulcanizing said tread and forming the connecting elements in the orifice(s) of the inserts;

demolding the tread after vulcanization.

30. A method for manufacturing a tread according to claim 29, characterized in that, in order to permit the insertion of the inserts into a non-vulcanized rubber strip, cutouts of a depth less than or equal to the thickness of said non-vulcanized rubber strip are first produced.

31. A method for manufacturing a tread of thickness E for a tire according to claim 29, characterized in that after demolding the vulcanized tread a grinding operation is effected on the rolling surface over a sufficient depth to make a plurality of rubber ridges formed by the walls of the cutouts provided with at least one connecting element appear on the surface.

32. A method for manufacturing a tread of thickness E for a tire according to claim 29, characterized in that the tread obtained is in the form of a closed ring.

33. A method for manufacturing a tread of thickness E for a tire according to claim 29, characterized in that the material composing the inserts is a material having a melting point less than and sufficiently close to the vulcanization temperature of said tread to become fluid shortly before the end of the vulcanization, taking into account the gradual increase in temperature of the rubber forming said strip, so as to permit the removal of said filling material after vulcanization, for example by suction or by blowing.

34. A method for manufacturing a tread for a tire according to claim 29, characterized in that the material forming the inserts is a cellulosic material.

35. A method according to claim 34 in which the cellulosic material includes paper pulp.

36. A method for manufacturing a tread for a tire according to claim 29, characterized in that the cutouts provided with at least one connecting element have a thickness of at least 0.4 mm.

37. A tread of thickness E for a tire, provided with a rolling surface, said tread being provided with a plurality of cutouts, each cutout being defined by the space defined principally between two main opposing walls, said walls being perpendicular to or oblique to the rolling surface, and having a depth h, measured as the maximum radial distance measured between the points of the walls of said cutout which are radially farthest away, at most equal to the thickness E of the tread, characterized in that:

the two main opposing walls of at least one cutout located in the part of the tread affected by the loading on the ground of the tire during travel are connected by one rubber connecting element, this connecting element having with each of the walls a total interconnection surface $S_E$, said total interconnection surface $S_E$ on each of the walls being at least 15% of the total surface $S_T$ of said wall and at most 40% of the said total surface $S_T$, all the points of the outer contour of the surface of intersection of the connecting element with one of the walls are located at a distance from the rolling surface which is strictly less than the depth of the cutout, and the surface $S_G$, equal to the surface, measured on said wall of the cutout, defined by the geometric contour L of minimum length and enveloping the total interconnection surface $S_E$, is at least 90% of the total surface $S_T$ of said wall.

38. A tread for a tire according to claim 37, characterized in that for at least one cutout, located in the part of the tread affected by the loading of the tire and provided with one connecting element, the ratio $T_P=S_P/S_T$ decreases virtually regularly with the wear of the tire at least starting from a predetermined level of wear, $S_P$ representing, on one of the main walls of said cutout, the connection surface remaining after partial wear of the tread and $S_T$ representing the total surface of said wall corresponding to the same level of partial wear of the tread.

39. A tread for a tire according to claim 37, characterized in that, for at least one cutout provided with one connecting element between a first main wall and a second main wall of said cutout, said connecting element forms an angle other than 90° with the direction perpendicular to the surface of the new tread, so as to maintain a great length of ridge on the rolling surface, whatever the degree of wear of the tread.

40. A tread for a tire according to claim 37, comprising a plurality of cutouts provided with one connecting element connecting a first main wall to a second main wall of said cutouts, characterized in that for two adjoining cutouts of virtually identical orientation the radial and/or axial positions of the connecting element of each of said cutouts are different, so as to be able to conserve a great length of active ridges on the rolling surface whatever the level of wear of the tread.

41. A tread for a tire according to claim 37, characterized in that, for at least one cutout provided with one connecting element, at least one main wall of said cutout is covered with at least one rubber mix other than the rubber mix forming the tread, and having improved properties of abrasion resistance.

42. A tread for a tire according to claim 37, characterized in that the rubber mixes covering the facing walls of one and the same cutout are of different types.

43. A tread according to claim 37, characterized in that all the cutouts comprising at least one connecting element are entirely located beneath the rolling surface of the tread when new and in that, furthermore, there are provided on the surface of the tread of the new tire cutouts the depth of which is greater than the smallest of the distances between the cutouts comprising at least one connecting element and the rolling surface of the tread of the tire when new.

44. A tread of thickness E for a tire, provided with a rolling surface, said tread being provided with a plurality of cutouts oriented virtually in the same direction, each of said cutouts being defined by the space defined principally between two main opposing walls, said walls being perpendicular to or oblique to the rolling surface, said cutouts having a depth h, measured as the distance in a radial direction between the points of the walls of said cutout which are closest to the rolling surface and the points of said walls which are farthest away from the rolling surface of the new tire, h being at most equal to the thickness E of the tread, said cutouts being spaced by an average pitch equal to p, said tread being characterized in that:

the two main opposing walls of the cutouts are connected by at least one rubber connecting element, the connecting element(s) having a total interconnection surface $S_E$ with each of the walls;

the connecting rate $T_P=S_E/S_T$ for each cutout is at least 0.10 and at most 0.80, $S_E$ being equal to the total interconnection surface of the connecting element(s) on each of the walls, $S_T$ representing the total surface of each main wall of said cutout; and the ratio p/h, satisfies the following equation:

$$\frac{p}{h} \geq \frac{1}{5}\left(\frac{1}{T_P}\right)^{0.75}.$$

45. A tread for a tire according to claim 44, comprising a plurality of cutouts provided with at least one connecting element connecting a first main wall to a second main wall of said cutouts, characterized in that for two adjoining cutouts of virtually identical orientation the radial and/or axial positions of the connecting elements of each of said cutouts are different, so as to be able to conserve a great length of active ridges on the rolling surface whatever the level of wear of the tread.

* * * * *

UNITED STATES PATENT AND TRADEMARK OFFICE
CERTIFICATE OF CORRECTION

PATENT NO. : 6,484,772 B1
DATED : November 26, 2002
INVENTOR(S) : De Labareyre et al.

It is certified that error appears in the above-identified patent and that said Letters Patent is hereby corrected as shown below:

<u>Title page,</u>
Item [73], Assignee, "Establissements" should read -- Etablissements --
Item [73], Assignee, "Clemont-" should read -- Clermont- --

<u>Column 2,</u>
Line 25, "is," should read -- is --

<u>Column 5,</u>
Line 10, "has" (second occurrence) should be deleted

<u>Column 6,</u>
Line 35, "a" should be deleted

<u>Column 8,</u>
Line 43, "a" should read -- an --
Line 44, "FIG. 9;" should read -- FIG. 9; and --

<u>Column 9,</u>
Line 31, "plane" should read -- planar --

<u>Column 11,</u>
Line 38, "$T_{P=SP}/S_T$" should read -- $T_P=S_P/S_T$ --

<u>Column 13,</u>
Line 20, "dbA" (both occurrences) should read -- dBA --

<u>Column 15,</u>
Line 31, "lest" should read -- least --

Signed and Sealed this

Twenty-second Day of July, 2003

JAMES E. ROGAN
*Director of the United States Patent and Trademark Office*